July 31, 1928.
W. M. ZAIKOWSKY
INTERNAL COMBUSTION ENGINE
Filed Oct. 24, 1925
1,679,286
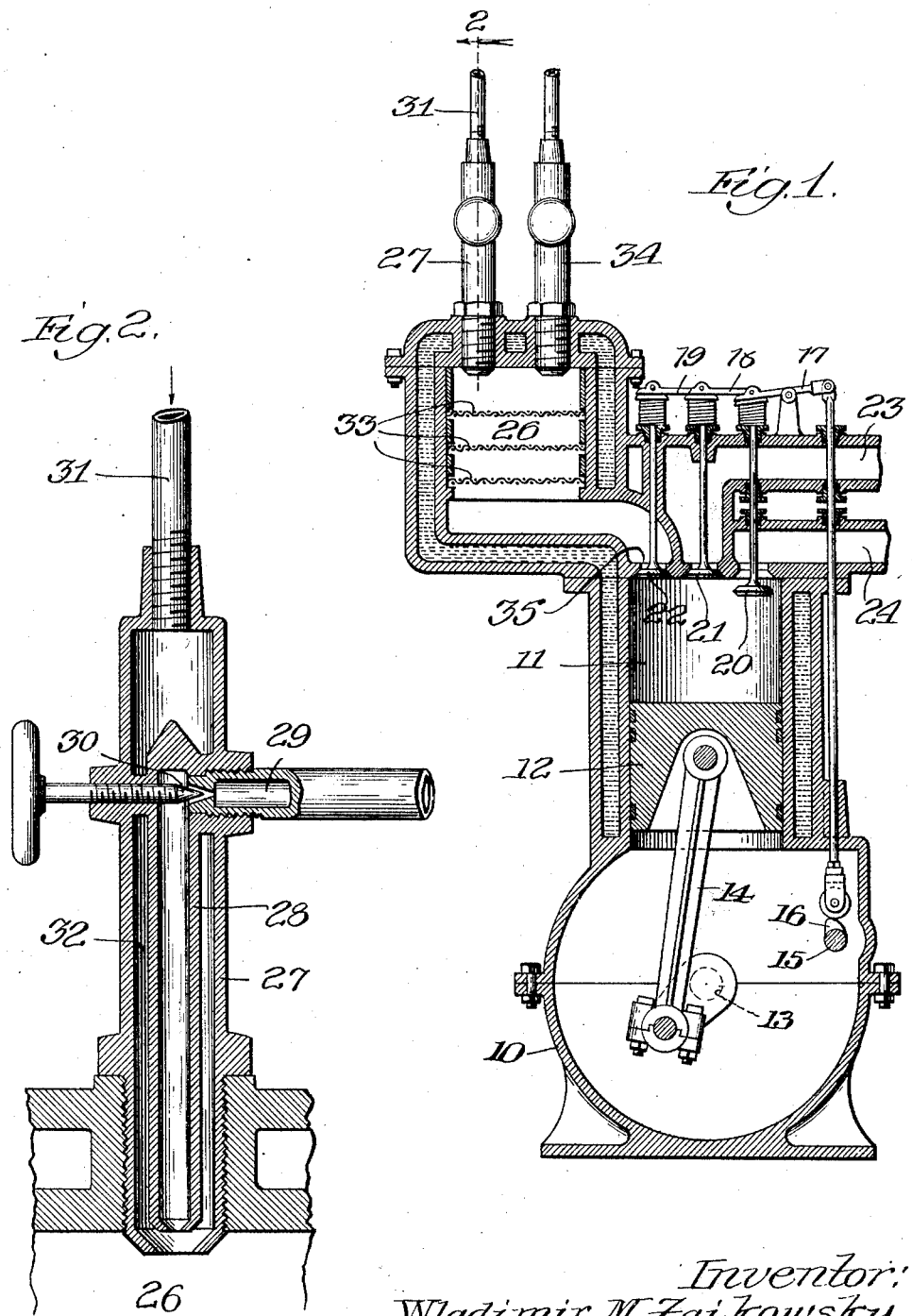

Patented July 31, 1928.

1,679,286

UNITED STATES PATENT OFFICE.

WLADIMIR M. ZAIKOWSKY, OF PASADENA, CALIFORNIA, ASSIGNOR TO STANDARD OIL DEVELOPMENT COMPANY, A CORPORATION OF DELAWARE.

INTERNAL-COMBUSTION ENGINE.

Application filed October 24, 1925. Serial No. 64,544.

This invention relates to internal combustion engines and is fully described in the following specification and shown in the accompanying drawings in which:

Figure 1 is a vertical section through an engine embodying the invention; and

Fig. 2 is an enlarged section on the line 2 of Fig. 1.

This invention is an improvement on the engine disclosed in my pending application Serial No. 714,263, filed May 19, 1924.

The embodiment illustrated comprises an internal combustion engine having a crank case 10 and cylinder 11 having a piston 12 slidable therein and operatively driving a crank shaft 13 by means of a connecting rod 14. A cam shaft 15 driven at one half the speed of the crank shaft 13 by means of gears (not shown) has a series of cams of which one only, 16 is shown, each cam operating one of the rocker arms 17, 18 and 19. These in turn operate respectively the exhaust valve 20, the inlet valve 21 and the compression chamber valve 22.

The inlet valve 21 controls the inlet passage 23 which is open to the air and which may be otherwise controlled as by means of a throttle valve (not shown). The exhaust valve 20 likewise controlling the opening into the exhaust passage 24.

The valve 22 controls the opening from the cylinder 11 into the passage 35 which leads from the compression chamber 26. This chamber is cooled as by means of the water jacket shown which is connected to the water jacket of the engine cylinder. The vaporization of the liquid fuel also assists in cooling the chamber 26.

Fuel is fed to the chamber 26 by means of a spray nozzle 27 which, as shown in Fig. 2, has an inner tube 28 connected to a pipe 29 which leads to a tank containing liquid or gaseous fuel. A needle valve 30 controls the flow of fuel from the pipe 29 to the spray nozzle. Air or the like is fed through a pipe 31 from any suitable source of air supply to the passage 32 surrounding the tube 28. Thus the air passing the lower end of the tube 28 picks up the liquid fuel and sprays it into the compression chamber 26. A series of wire mesh screens 33 or the like serve to catch the particles of liquid fuel and to assist in its vaporization. A similar spray nozzle 34 may be used for feeding water to the engine cylinder in a manner similar to that employed for feeding liquid fuel.

The operation of the engine is as follows: On the first suction stroke the inlet valve 21 only is opened drawing in a charge of air through the inlet passage 23. On the compression stroke the piston compresses the air thus drawn in, all the valves remaining closed until after compression has begun, when the compression chamber valve 22 opens thereby permitting some of the partly compressed air in the cylinder 11 to be forced into the compression chamber 26, assuming that the pressure in the chamber 26 is near that of the atmosphere. If however prior to starting the engine, air from the pipe 31 is used to draw fuel from the pipe 29 and to force the mixture of fuel and air into the chamber 26, the pressure in the chamber 26 may be high enough, upon opening the valve 22, to force part of the mixture of fuel and air in the chamber 26 into the cylinder 11.

As the piston 12 continues to ascend, the valve 22 closes a little in advance of the point of actual substantial ignition, the spark plug or other device for initiating ignition not being shown. Prior to closing the valve 22 however, some of the charge in the cylinder 11 is forced back into the chamber 26 and, if the engine has been in constant operation for some little while, the pressure in the chamber 26 at the time of the closing of the valve 22 becomes nearly constant for a given set of operating conditions. Thus fresh air is drawn in on each suction stroke through the inlet 21, and on the compression stroke is mixed with a mixture of fuel and air on the opening of the chamber valve 22, the fuel having been sprayed substantially continuously into the chamber during the operation of the engine.

Thus an over-rich mixture is maintained at all times in the chamber 26 which precludes the possibility of a back fire into this chamber. This arrangement also provides an easy means for obtaining stratification in the cylinder of the combustible charge.

In lieu of the air spray construction illustrated, the fuel may be directly injected into the chamber 26 by a pressure pump. To do this the air pipe 31 may be closed by a valve not shown and fluid fuel admitted under pressure through the needle valve 30. The fuel thus entering the compression chamber 26 will mix with air and, in the case of a liquid fuel be vaporized by the air entering the chamber. This vaporization will assist the action of the water jacket in lowering the temperature of the mixture of air and fuel therein.

A groove 35 is provided in the valve seat around the valve 22 which catches and holds any unvaporized fuel which is being swept around the walls of the passage 25. As this portion of the valve seat is in the head of the engine it is quite hot and consequently vaporizes the fuel caught therein.

The engine above described may operate with a compression ratio substantially in excess of that at which detonation would ordinarily occur, in which case adequate cooling of the chamber 26 must be provided, or it may operate at ordinary compressions in which case no cooling of the chamber is required.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. The method of operating a reciprocating internal combustion engine having a cylinder comprising compressing the charge partly in the cylinder and partly in a chamber connected thereto, and feeding a liquid to be vaporized to said chamber whereby the vaporization of said liquid will cool the charge in said chamber, and causing said chamber to communicate with said cylinder on the compression stroke only, said chamber receiving a substantial portion of the charge.

2. The method of operating a reciprocating internal combustion engine having a cylinder comprising compressing the charge partly in the cylinder and partly in a chamber connected thereto, and feeding a liquid fuel to be vaporized to said chamber whereby the vaporization of said liquid fuel will cool the charge in said chamber, and causing said chamber to communicate with said cylinder on the compression stroke only, said chamber receiving a substantial portion of the charge.

3. In an internal combustion engine, a cylinder having inlet and exhaust valves, a compression chamber communicating with said cylinder on the compression stroke only, said chamber being large enough to receive a substantial portion of the charge in said cylinder, a valve controlling communication between said chamber and cylinder, and means for supplying fuel to said chamber.

4. In an internal combustion engine, a cylinder having inlet and exhaust valves, a compression chamber communicating with said cylinder on the compression stroke only, said chamber being large enough to receive a substantial portion of the charge in said cylinder, a valve controlling communication between said chamber and cylinder, means for supplying fuel to said chamber, and means in the head of said cylinder for catching unvaporized fluid.

5. In an internal combustion engine, a cylinder having inlet and exhaust valves, a compression chamber communicating with said cylinder on the compression stroke only, said chamber being large enough to receive a substantial portion of the charge in said cylinder, a valve controlling communication between said chamber and cylinder, means for supplying fuel to said chamber, and a groove in the head of said cylinder for catching unvaporized fluid.

WLADIMIR M. ZAIKOWSKY.